United States Patent [19]

Gelardi

[11] 4,180,431
[45] Dec. 25, 1979

[54] TAPE SPLICING DEVICE

[76] Inventor: Anthony L. Gelardi, Box 127, Cape Porpoise, Me. 04104

[21] Appl. No.: 2,468

[22] Filed: Jan. 10, 1979

[51] Int. Cl.² ............................................. B31F 5/00
[52] U.S. Cl. ................................................. 156/505
[58] Field of Search ........................ 156/157, 505, 502

[56] References Cited

U.S. PATENT DOCUMENTS

| 3,082,866 | 3/1963 | Kessman | 156/505 |
| 3,136,679 | 6/1964 | Bender | 156/505 |
| 3,546,046 | 12/1970 | MacQueston | 150/505 |
| 3,914,491 | 10/1975 | Takahashi | 156/505 |

Primary Examiner—Douglas J. Drummond
Attorney, Agent, or Firm—Staas & Halsey

[57] ABSTRACT

A tape splicing device having an elongated bar member of substantial length with a detachable splice block at one end thereof, and the remaining portion of the elongated member being subdivided into a plurality of splice sticks. Each individual splice stick is provided with a handle portion and a head portion. A splicing tape is provided in a longitudinally extending recess along the upper surface of the elongated member and overlaps the plurality of head portions of the splice sticks. The splicing tape is severed approximately midway of each head portion so that a short section of splice tape will be removed along with an individual splice stick as it is removed from the overall device. The handle portion of each splice stick is preferably at an angle of 45° to the head of the splice stick having the short section of splicing tape thereon for ease of manipulation in applying the splicing tape section to the ends of cassette tapes. The ends of the cassette tape are normally positioned abutting each other within a groove in the splice block. The splice block normally has a tail portion which after removal of the splice block remains with the elongated member to protect the last splice stick and the short section of splicing tape thereon. Angled recesses and grooves opposite thereto are provided along opposite surfaces of the elongated member for permitting easy detachment of the individual splice sticks from the entire device.

10 Claims, 3 Drawing Figures

TAPE SPLICING DEVICE

BACKGROUND OF THE INVENTION

1. Field of the Invention

The present invention pertains to devices and equipment for splicing of cassette tape and the like in as easy as possible, positive and secure manner.

2. Description of the Prior Art

Many times it is necessary and/or highly desirable to manually splice tape and film as used with tape recorders, film projectors, tape and film editing devices, and the like. However, in known prior art devices, the equipment for such splicing either is large and bulky, heavy weight, and usually quite expensive, or else if portable and light weight, relatively difficult to use or else often times does not produce a positive and secure splice.

SUMMARY OF THE INVENTION

The tape splicing device of the present invention has a number of important features which make it very easy to use, and yet is very positive and substantially fool proof in operation. It is also very lightweight, easily and conveniently portable, and quite inexpensive.

The basic device consists of an elongated splice bar member having a plurality of individually separable splice sticks thereon and a single splicing block therewith. Normally, the overall device is injection molded of polystyrene in bars with twelve sticks and a single splice block at one end. Each splice stick is provided with a short piece of splicing tape so that when a specific splice stick is removed from the overall bar member, the short section of splicing tape is ready and available for application to tape to be spliced. The splice block has a groove provided therein for reception of the respective ends of the tape to be joined after it has been removed from the overall splicing device. When the ends of the tape to be spliced are appropriately abutted within the groove of the splice block, then the splice stick may be used to quickly and easily apply the pre-cut section of splicing tape to the joint. Thus, a positive and secure splice may be very quickly obtained.

An object of the present invention is to provide a tape splicing device which is lightweight, easily portable, easily useable, and relatively inexpensive.

A further object of the present invention is to provide a tape splicing device having a splicing block provided therewith with an appropriate groove therein for reception of respective ends of a tape to be spliced, together with a plurality of splice sticks each having a short section of splicing tape adhering thereto for quick and easy application to the tape ends to be joined.

A still further object of the present invention is to provide an overall splicing device having all of the component elements necessary to properly and securely splice ends of cassette tape together.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
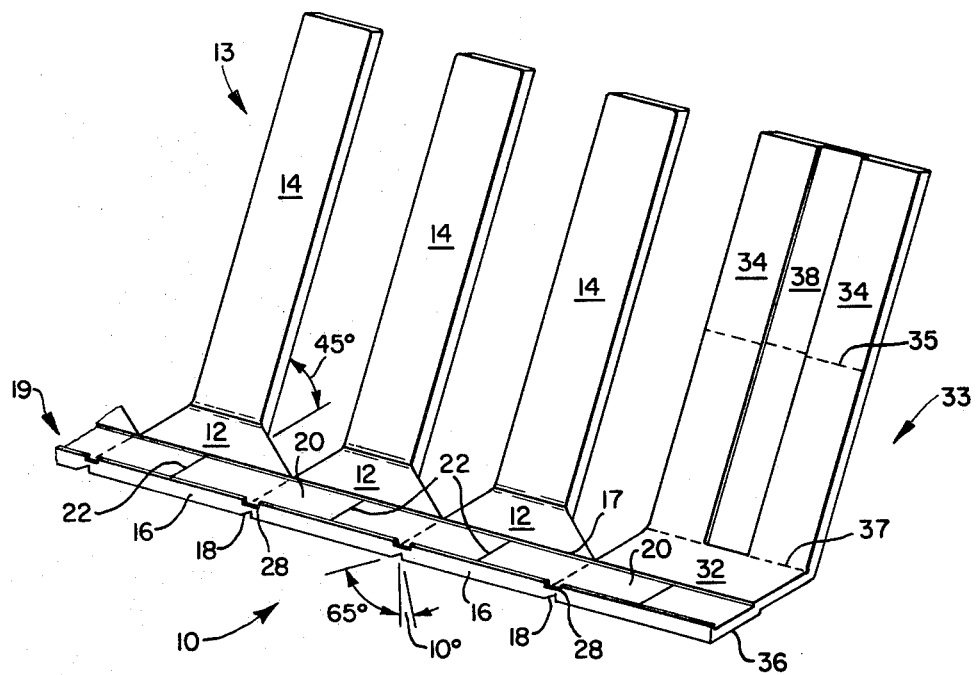
FIG. 1 is a perspective view of the basic elements of the tape splicing device of this invention.

The present invention will now be described by reference to the figures of drawing. Looking at FIG. 1 of the drawings, reference numeral 10 indicates the overall device of an elongated bar member which includes a plurality of splice stick members 13 having handle portions 14 preferably at approximately an angle of 45° from a tapered head portion 12. Each tapered head portion 16 is integral with an adjacent flat head portion 16 of substantially rectangular configuration.

The splicing device of this invention is preferably formed of plastic material, such as polystyrene, and the entire device normally may be formed at one time. The rectangular head portion 16 of each respective splice stick is connected at each end to the head portions 16 of the adjacent splice sticks. Preferable an angled recess 18 is provided at the abutting portions of the respective head portions 16. Opposite the angled recesses 18 are provided grooves 28 which together with the angled recesses 18 leave just a small connecting portion between the respective head portions. Thus, when a user of the overall device decides to remove an individual splice stick 13 from the overall splicing device, it only requires a small amount of twisting movement to detach an individual splice stick from the immediately adjacent one. Normally, a plurality of splice sticks (preferably twelve) will be provided with each overall splicing device.

At one end of the elongated bar member is a splice block 33 appropriately mounted by a tail piece 32, 36. The splice block 33 is provided with a groove therein 38 of approximately the width of conventional cassette tapes with which the device preferably is to be used. The tail piece 36 is connected by an angled recess 18 and an opposite groove 28 to an adjacent splice stick head 16.

Figure 3:
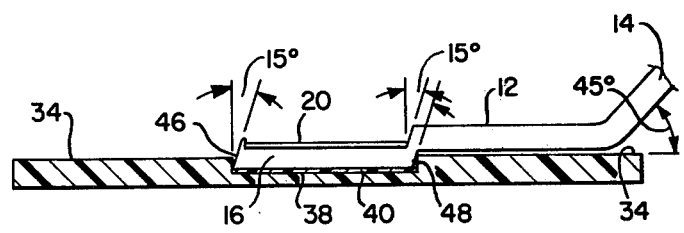
FIG. 3 is a side elevational view, partly in cross-section, taken generally along line 3—3 of FIG. 2.

Normally a small recess 17 will be provided longitudinally along the entire upper surface of the elongated bar member, that is in the head portion 16 and tail piece portion 36. This recess 17 receives and contains a splicing tape 20 therewithin. Once an overall length of splicing tape 20 is applied in the recess 17, appropriate cuts 22 may be made in the tape near the middle of each head portion 16 to assure that as each individual splice stick is removed a short section of splicing tape 20 will adhere thereto and be removed therewith for use in the actual splice. A crease or partial perforation 37 may be provided between the tail piece 32, 36 and the splice block 33 for ease in separation thereof. An indicia line 35 may be provided in order to indicate to a user of the device where the ends of tape to be spliced should meet and abut. The groove 38 is provided between the raised sides 34, as best seen in FIG. 3.

Figure 2:
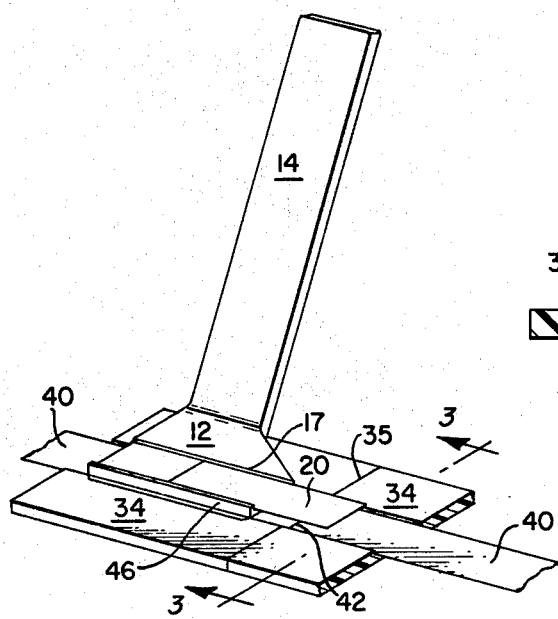
FIG. 2 is a perspective view of a single splice stick together with the splice block as in use.

Looking at FIGS. 2 and 3 of the drawings, the overall use of the splicing device of this invention will now be described. After the splice block 33 is removed from the tail piece 32, 36 by breaking along line 37, it is placed upon a proper support and the respective ends of a recording tape 40, or the like, may be abutted against each other within the groove 38 near the indicia line 35 of the splice block. A single splice stick 13 with the angled handle 14, the tapered head portion 12 and the rectangular head portion 16 is then removed from the elongated bar member. A short section of splicing tape 20, as best seen in FIG. 2, remains attached to the rectangular head portion 16 and comes off of the adjacent head portion 16 of the bar member when the individual stick is removed therefrom.

Normally the leading edge 46 of the stick head is placed against the side 44 of the splice block groove 38 to assure proper alignment of the short section of splicing tape onto the respective ends of the cassette recording tape. This can be seen in both FIGS. 2 and 3 of the drawings. Then by slightly rotating the handle 14 of the splice stick, the section 20 of splicing tape will be placed over the abutting ends of the recording tape 40, whereupon section 20 may be pushed down onto the butted cassette tape ends, and then the splice stick peeled away, leaving the splice tape section 20 remaining over the recording tape ends. At this time the splice tape section 20 can be burnished or pressed down with a finger to assure that it firmly adheres to the respective recording tape ends. Thus, in a very quick and simple operation, cassette recording tape or the like may be quickly and conveniently, and also securely permanently fastened and spliced together.

As indicated above, the overall device is preferably made of plastic, and if, for example, polystyrene is used, this device can be injection molded with all of the recesses, grooves and indicia provided therewith in the one simple forming operation.

As shown in FIG. 1, the handle portion 14 is preferable at an angle of approximately 45° from the head portions 12, 16, and the angled recess 18 preferably has the most slanted surface portion thereof at approximately 65° from the vertical while the other edge of said recess, which is substantially vertical, preferably has an angle of approximately 10° from the vertical. The opposite groove 28 is preferably a simple groove with edges perpendicular to the bottom surface of the groove. The groove 38 in the splice block 33 between the side portions 34 is also of the simple right angle type, but the leading and trailing parallel edge portions 46 and 48 of the rectangular head portions 16 of the splice sticks preferably make an angle of approximately 15° from the vertical as shown in FIG. 3 of the drawings.

Thus, the splicing device of this invention provides an easy to use, readily portable, and relatively inexpensive device for the quick and easy splicing of recording tape, movie film, and the like, wherever a user may desire to do so.

Normally, each individual splice stick is approximately two inches long, and the splice block with tail pieces also is of approximately the same length. The splicing tape 19 is cut approximately in the middle of each splice sticks' head so that as each individual stick is broken off to be used, it has a portion of the splice tape attached and adhered to thereof and also exposed ready to make the desired splice. The tail piece 32, 36 of the splice block which remains with the overall structure when the splice block 34 is detached, provides a tail piece which protects the last splice tape 20 of the last splice stick. Obviously, it is recommended and advisable to start removing each individual splice stick from the end of the bar member opposite the splice block so that no individual splicing tape section is left exposed as each splice stick is removed, and especially so when the entire or whole splicing bar member is not used at the particular time.

Thus, the device of this invention has the added feature of permitting individual splices to be made when and as needed with the remaining splicing device still useable and without fear of the individual tape splicing sections 20 becoming contaminated or rendered unuseable by contact with undesired foreign matter. Thus, each time an individual splice stick is removed just prior to making a splice, the tape splicing section 20 is clean and free from any contamination, and obviously need not be touched by human fingers until the burnishing operation takes place at the completion of the splicing operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tape splicing device comprising:
an elongated bar member having as a part thereof means for positioning and supporting abutting ends of a tape to be spliced, and
said elongated bar member also having as a part thereof
at least two detachable splice sticks each with a head portion having and supporting a short section of splicing tape thereon and a handle portion for use in manipulating the head portion to apply the short section of splicing tape to the ends of recording tape to be spliced.

2. The device as set forth in claim 1, wherein a plurality of more than two individual splice sticks are provided, together with means connecting the individual splice sticks together for permitting quick and easy detachment from each other.

3. The device as set forth in claim 2, wherein the tape positioning and supporting means includes a splicing block connected to the elongated bar member by readily detachable means, said splicing block containing an elongated groove therein of just slightly larger width than the normal width of tape which is to be spliced.

4. The device as set forth in claim 3, wherein said device is made of polystyrene by injection molding.

5. The device as set forth in claim 3, wherein at least one of the readily detachable means for securing the splicing block and the splice sticks together include angled recesses along one surface of the elongated bar member, and complimentary grooves along the opposite surface of the bar to provide thin, easily separable connecting portions.

6. The device as set forth in claim 5, wherein the angled recesses have sloping sides making an angle of approximately 65° and 10° respectively from a perpendicular to the member, and the complimentary grooves on the opposite surface of the elongated bar member are recesses having sides substantially perpendicular to the surface.

7. The device as set forth in claim 1, wherein each of the respective handle and head members of the splice sticks are at approximately a 45° angle relative to one another for ease of manipulation of each stick during use in applying the short section of splicing tape.

8. The device as set forth in claim 7, wherein the splice block has a pre-inscribed detachment line between the block and a tail piece therefor which is detachably attached to the overall device for permitting easy detachment of the splice block therefrom, and normally the splice block is also at an angle of approximately 45° to the tail piece and in alignment with the handle members of the individual splice sticks.

9. A device useable for splicing ends of cassette tape together comprising:
- an elongated member of substantial length;
- a detachable splice block having a groove therein for receiving ends of a cassette tape to be spliced joined to said elongated member;
- the rest of said elongated member being subdivided into a plurality of splice sticks each having a head portion and a handle portion;
- splicing tape extending substantially the length of the elongated member and overlapping each of the splice stick head portions;
- said elongated member being provided with angled recesses along one surface thereof and complimentary grooves mating with said recesses along the opposite surface thereof for providing reduced detachable connections between the individual splice sticks as well as the splice block;
- and the handles of the individual splice sticks being at an angle to the individual heads of the splice sticks and substantially in alignment as provided with the elongated member.

10. The device as set forth in claim 9, wherein said device is made of resilient yet hard surfaced plastic material which has inherent strength together with resiliency.

* * * * *